Nov. 9, 1937.  M. T. KNUTZEN  2,098,342
HOIST BRAKE
Filed May 11, 1936  2 Sheets-Sheet 1
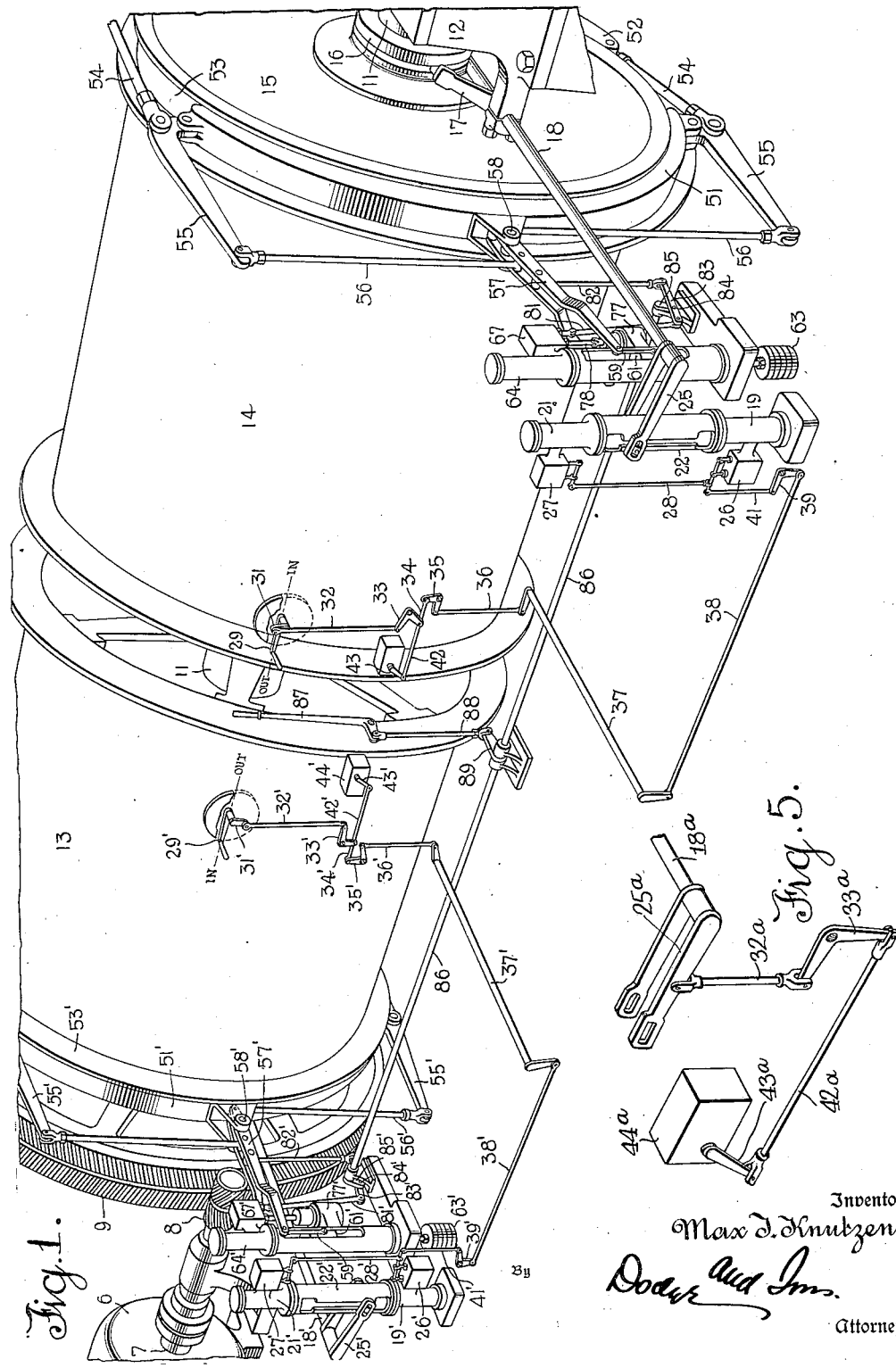

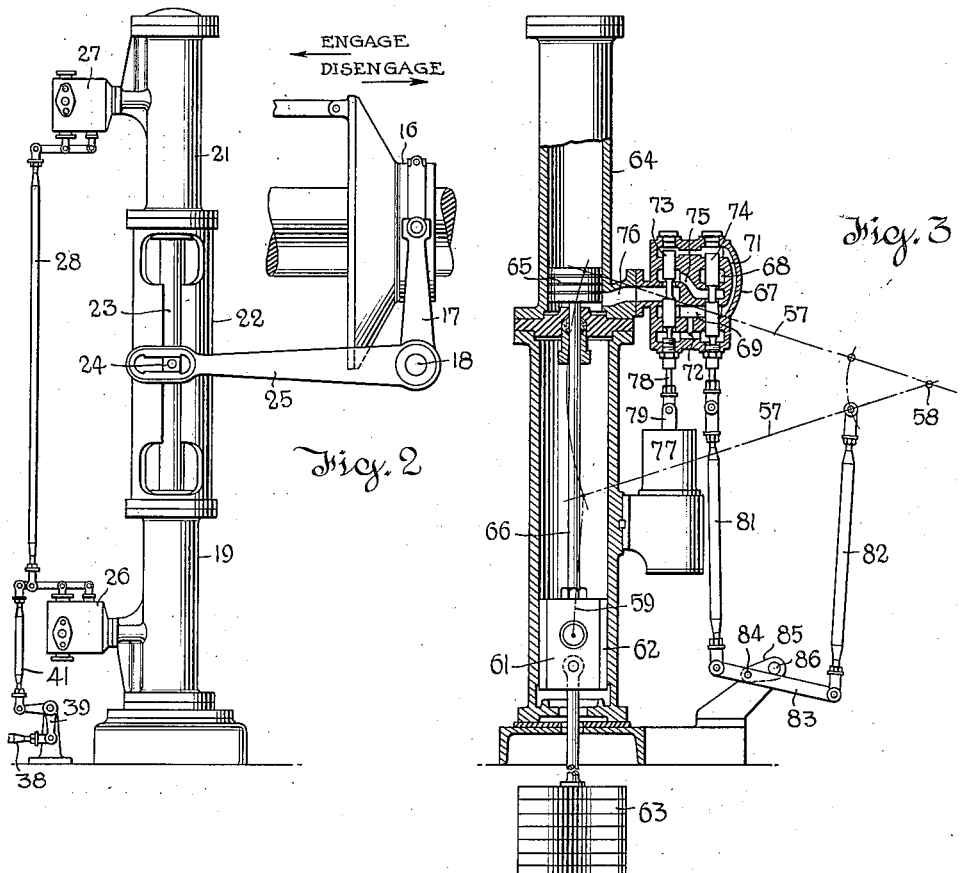

Patented Nov. 9, 1937

2,098,342

UNITED STATES PATENT OFFICE 2,098,342

HOIST BRAKE

Max T. Knutzen, Toronto, Ontario, Canada, assignor to Nordberg Manufacturing Company, Milwaukee, Wis., a corporation of Wisconsin Application May 11, 1936, Serial No. 79,142

20 Claims. (Cl. 192—17)

This invention relates to mine hoists and similar devices.

In large hoists for mines it is common practice to operate brakes on hoist drums by means of weights which act to apply the brakes, and pressure motors which lift the weights to release the brakes. Thus failure of pressure results in a brake application. With such brakes it is also known practice to use a device which responds to overspeed or overwind to deenergize a solenoid which vents the pressure motor, irrespective of the setting of the motor control valves, and thus apply the brakes.

In recent years hoists have been proposed in which a plurality of hoist drums are rotatably mounted on a single motor driven shaft, to which each of the various drums may be clutched at will. Each drum had its own brake of the general type above described, and its own clutch and independent actuators for each thereof. Hoists of this type, as heretofore arranged, have been awkward for a single operator to control, and have been dangerous because of the possibility of releasing the brake on a drum while unclutched from the shaft.

The objects of the present invention are to provide means to ensure application of the brake to any drum as an incident to the unclutching of that drum from the motor driven shaft; to permit combination of this arrangement in simple manner with overspeed and overwind devices (either or both) which devices now are rather highly developed and standardized; to arrange all controls so that failure of the pressure source or electric circuit will ensure a brake application, thus putting failure on the side of safety; and perhaps most important of all to provide for the actuation by a single actuator of the brake on any drum or drums which may be at the time clutched to the motor driven shaft.

These and other objects which will be apparent as the description proceeds, are attained by the preferred construction illustrated in the accompanying drawings, in which,—

Fig. 1 is a perspective view of a two-drum hoist, showing the mechanical connections of the brake and clutch controls, but omitting certain bearings and all supply and discharge pipes for the pressure fluid which actuates the clutch and brake motors (which pipes are conventional) and omitting, to avoid confusion, the electric circuits which are diagrammed in another figure.

Fig. 2 is an elevation of a clutch-actuating motor and a portion of its clutch. The parts are shown at mid-stroke.

Fig. 3 is a vertical section of a brake controlling motor and its controlling valve gear. The parts are in brake applied position with the control valve lapped and the solenoid energized.

Fig. 4 is a diagram of the electric circuits in the condition of Fig. 1 to which this figure is ancillary.

Fig. 5 is a fragmentary view similar to a portion of Fig. 1, showing a modification.

Two drums suffice to illustrate the control principle for a plurality of drums. Some features are applicable to a single drum and all to two or more.

The driving motor 6 drives through shaft 7 and pinion 8 a large gear 9 fast on shaft 11. Shaft 11 is supported in bearings, one of which appears at 12 and carries two hoist drums 13 and 14 each freely rotatable on shaft 11 independently of the other.

Each of the drums 13 and 14 may be independently clutched to shaft 11 by a motor actuated clutch corresponding thereto. The clutches are mechanically identical except that they are reversely arranged (right to left) so that the control linkages are counterparts and may be readily connected. That for drum 14, which is more fully visible, will be described, but the same reference numerals primed are applied to corresponding visible portions of the clutch control mechanism for drum 13.

The housing 15 encloses the clutch proper and 16 is the actuating collar shiftable in the direction of the axis of shaft 11,—inward to engage and outward to disengage the clutch. Fork 17 on rock shaft 18 shifts the clutch as the shaft is rotated back and forth through a limited angle by a pressure motor (preferably but not necessarily hydraulic).

Referring now also to Fig. 2. This motor comprises a lower single-acting cylinder 19 and an opposed upper single acting cylinder 21 connected by a slotted spacing yoke 22. A rod 23 connects single acting pistons in the two cylinders and this rod has a pin and slot connection 24 with arm 25 fast on shaft 18.

An inlet and exhaust valve mechanism 26 for cylinder 19, and a similar inlet and exhaust valve mechanism 27 for cylinder 21 are connected by link 28 to be operated reversely, so that raising of rod 28 causes rod 23 to move downward and engage the clutch. Conversely, lowering rod 28 causes rod 23 to move upward and disengage the clutch. In effect the parts 19 to 28 form merely a reversible full-stroke motor.

The clutch controlling handle 29 is connected to actuate rod 28 and consequently valves 26 and 27 by way of crank 31, link 32, bell crank 33, link 34, bell crank 35, link 36, bell crank 37, link 38, bell crank 39 and link 41. A link 42 connects bell crank 35 with actuator arm 43 of an electric switch indicated by numeral 44 applied to its case.

As shown in Fig. 1 (and Fig. 4) the actuator 29 for the clutch for drum 14 is in "out" (disengaged position) and switch 44 is in open (circuit breaking) position. The actuator 29' for the clutch for drum 13 is in "in" position and its switch 44' is in closed position. To actuate respective clutches the actuator 29 or 29', as the case may be, is swung 180° raising or lowering the corresponding link 32 or 32'. The switches are each arranged to open upon slight displacement of the related actuator from its "in" position.

Each drum 13 and 14 has a corresponding brake and that for drum 14 will be described as the two are identical. The brake parts for drum 13 bear similar numerals, primed.

Two shoes 51 and 52 embrace a brake drum 53 on drum 14. Links 54 and force multiplying bell cranks 55 connect the shoes. Links 56 connect the bell cranks 55 to an actuator lever 57 on opposite sides of its fulcrum 58, so that if the outer end of lever 57 (that remote from drum 53) moves down the brake is applied.

In Fig. 3 the limiting center line positions of lever 57 are indicated in broken lines. As best shown in Fig. 1 lever 57 is bifurcated and its outer bifurcated end is connected by links 59 to cross-head 61 (see Fig. 3) guided in vertical ways 62 and drawn downward by weight 63 which develops the brake applying force.

Mounted in the upper end of the housing for ways 62 is a cylinder 64 in which works a piston 65. The space above the piston is vented, so that the piston is single-acting. The piston is connected by rod 66 with cross-head 61.

Mounted on the side of cylinder 64 is a valve housing 67 which encloses a valve mechanism of the type described and claimed in patent to Knutzen et al., No. 1,914,028, issued June 13, 1933. The housing 67 has a chamber 68 to which fluid under pressure is supplied, and an exhaust passage 69. The passages 71 and 72 leading to the ends of the piston valves 73 and 74, which are of the inside cut-off piston type, are merely to balance these valves.

The valve 74 in its upper position connects passage 75 with supply chamber 68 and in its lower position connects passage 75 with exhaust passage 69. These connections are selective as the valve has a slight lap in its neutral position (see Fig. 3). Valve 73 in its upper position connects port 75 with passage 76 leading to the space below piston 65 and in its lower position connects passage 76 with exhaust passage 69. These connections also are selective, the valve having a lap.

Valve 73 is held up when solenoid 77 is energized. Whenever solenoid 77 is deenergized the valve 73 is moved down, cutting valve 74 out of control and venting the space below piston 65 so that weight 63 applies the brakes. If the solenoid 77 be again energized it restores the valve 73 to its upper position, closing the vent from the space below piston 65 and restoring valve 74 to control. The operative connections comprise a link 78 connected with valve 73 and with the armature 79 associated with solenoid 77.

Valve 74 is controlled by a follow-up mechanism comprising a link 81 connected with the valve, a link 82 connected with lever 57, and a floating lever 83 whose controlling fulcrum is 84. As fulcrum 84 rises valve 74 is first lifted to admit pressure beneath piston 65. Rise of piston 65 and connected lever 57 laps valve 74. It follows from the construction that for each position of fulcrum 84 there is a corresponding position which piston 65 seeks to reach and then come to rest.

The controlling fulcra 84, 84' are carried on parallel arms 85, 85' fast on rock shaft 86. Shaft 86 is actuated by a single hand lever 87 through link 88 and arm 89.

In Fig. 4, 91 and 92 are leads connected with any suitable source of electric current. Lead 91 is connected in series through two safety switch devices 93' and 93 to a junction 94.

The devices 93' and 93 are identical and of known form, and are driven respectively by drum 13 and drum 14. A centrifugal governor A responds to speed to ring a bell B at a desired speed limit and to open the circuit through the device at a slightly higher speed. There are also cam operated overwind switches which operate at the limits of wind to open the circuit independently of speed.

Thus device 93' disconnects lead 91 if drum 13 rotates too fast or too far. Device 93 performs the same functions as to drum 14. These functions are familiar to those skilled in the art.

From junction 94 there are parallel circuits to junction 95 with lead 92. One circuit through solenoid 77 is controlled by switch 44; the other through solenoid 77' is controlled by switch 44'.

Since switch 44 is open if drum 14 is unclutched and since deenergization of solenoid 77 takes control of the brake on drum 14 away from lever 87 and applies the brake, and since the same is true as to similar parts associated with drum 13, it is possible to control the brakes for both drums by a single lever and still secure the desirable condition, that if either drum be unclutched at any time its brake will apply. This result is attained without affecting control of the brakes of any drum which is clutched to shaft 11.

It follows that the simple act of clutching any drum to the drive shaft places its brakes under the control of the common actuator 87, whatever its position, provided the circuits are intact and energized, and provided pressure fluid is available to actuate the motors. If pressure fluid be not available to actuate the motors when a clutch controller is shifted from "out" to "in" position, the clutch would not engage but under such conditions all brakes would be applied and could not be released.

Thus from the safety standpoint and from the manipulative standpoint the arrangement has marked advantages.

The hoists are operated by starting and stopping motor 6, the motor being reversible and controlled by a controller mechanism of conventional form, not shown in the drawings because not involved in the present invention. The motor controller which customarily is actuated by a single lever, and the brake lever 87 afford the necessary control of the hoists.

If both hoists are in use, both clutch levers 29 and 29' are in "in" position, so that both drums are clutched to shaft 11 and both brakes are under control of lever 87. At times however only one hoist will be needed. To put drum 14 (for example) out of action, lever 29 is swung to "out" position (see Fig. 1). This disengages the clutch for drum 14 and even before the clutch actually disengages, opens switch 44, deenergizing solenoid 77. This vents motor 64 and disconnects the motor from its control valve, causing the brake on drum 14 to apply irrespective of the position of lever 87. The brake remains applied and out of control by lever 87 so long as the drum is unclutched. If the drum later be clutched to shaft 11 the brake for the drum is automatically subjected to control by lever 87. This follows for the reason that in order to clutch drum 14 to shaft 11 the control handle 29 must be swung to "in" position, entailing the closure of switch 44 and the energization of solenoid 77. Energization of solenoid 77 lifts the valve 73 so that the vent from the motor 64 is closed and the motor is once more under control of the valve 74.

To summarize: The brakes for all clutched drums are under simultaneous control by lever 87. Initial motion of the clutch control for any drum toward disengaged position, applies the brake on that drum, and such brake cannot thereafter be released until the drum is again clutched to shaft 11.

Various modifications are possible by the exercise of mechanical skill and no limitation to the precise arrangement illustrated is implied.

The feature of applying the brake as an incident to the release of the clutch is useful in any case where the driving connection between a hoist drum and its driving shaft includes a clutch mechanism. This is true irrespective of the number of drums used.

In Fig. 1 the switch which causes application of the brake as an incident to the release of the clutch, is shown as actuated by the clutch controller 29 rather than by the clutch itself, this construction being preferred because it secures an earlier application of the brake with reference to release of the clutch in the event that there is any lag in the response of the motors, or either of them.

In Fig. 5 a modification is illustrated in which the switch, instead of being actuated by the controller, is actuated directly by an element of the clutch, specifically by the rock shaft which shifts the clutch collar.

The reference numerals used in Fig. 5 correspond to those used in Fig. 1 but are differentiated by the letter $a$.

In Fig. 5, 18a is a rock shaft which actuates the clutch collar, i. e., corresponds to the part 18 of Fig. 1. A link 32a is pinned at an appropriate radial distance to the arm 25a on shaft 18a, and is connected through the bell crank 33a and link 42a with the actuating arm 43a of the switch 44a. The switch 44a performs the same function as the switch 44 of Fig. 1. The parts are so arranged that as the clutch starts to disengage the switch 44a is opened. Functionally the device is identical with that shown in Fig. 1. The only difference is that the switch will not be opened until the clutch actually starts to disengage, whereas in the structure of Fig. 1 the switch might open slightly in advance of the actual response of the controller to the disengaging movement of the controller.

Furthermore, the invention can be applied to a hoist in which one drum is fast on the drive shaft and another drum is (or other drums are) releasably clutched to that shaft. Such a structure can be readily explained with reference to Fig. 1.

Assume that the drum 14 is keyed to the shaft 11. The clutch then is eliminated. This involves the elimination of the parts 16 to 44 inclusive.

The elimination of the switch 44 does not imply that the circuit is broken. On the contrary, there would be a connection from 95 to winding 77. Stated differently, the effect is the same as if the switch 44 were constantly closed. This arrangement would give control of all the brakes including that on the drum 14 by the single actuator 87. Any drum which was unclutched from the shaft would have its brake removed from control by the actuator 87 and applied. Stated differently, the actuator 87 would always have control of the brake on the drum 14 and would also have control of the brake on the drum 13 whenever that drum was clutched to the shaft 11. In other words, a drum which is fast on the shaft and cannot be released therefrom does not need the automatic brake applying means. Its brake would therefore always be controlled by lever 87. The presence or absence of such a drum does not affect the principle of the invention.

What is claimed is,—

1. The combination of a power-driven shaft; a winding drum rotatably mounted relatively to said shaft; clutch means interposed between said shaft and drum and having an engaged position and a released position; a power-controlled brake for said drum including means biasing the brake in an applying direction and a motor which when energized overpowers said biasing means; a manually actuated controller for said brake motor; and means associated with said clutch means and rendered effective as an incident to disengagement thereof to interrupt the supply of energy by said controller to said motor and deenergize said motor.

2. The combination of a power-driven shaft; a winding drum rotatably mounted relatively to said shaft; clutch means interposed between said shaft and drum and having an engaged position and a released position; a power-controlled brake for said drum; a manually actuated controller therefor; and means associated with said clutch means and rendered effective as an incident to disengagement thereof to disconnect said power actuated brake from said controller and apply the brake.

3. The combination of a power-driven shaft; a winding drum rotatably mounted relatively to said shaft; clutch means interposed between said shaft and said drum and having an engaged position and a released position; a clutch controller having a clutch engaging and a clutch releasing position; a brake for said drum, said brake being biased toward applied position; a pressure motor for releasing said brake; manually controlled valve means for controlling said pressure motor; and means associated with said clutch controller and rendered effective by motion thereof from clutch engaging position to vent said pressure motor.

4. The combination of a power-driven shaft; a winding drum rotatably mounted relatively to said shaft; clutch means interposed between said shaft and said drum and having an engaged position and a released position; a clutch controller having a clutch engaging and a clutch releasing position; a brake for said drum, said brake being biased toward applied position; a pressure motor for releasing said brake; manually controlled valve means for controlling said pressure motor; and means associated with said clutch controller and rendered effective by motion thereof from clutch engaging position to disconnect said valve means from said pressure motor and vent said motor.

5. The combination of a power-driven shaft; a winding drum rotatably mounted relatively to said shaft; clutch means interposed between said shaft and said drum and having an engaged position and a released position; a clutch controller having a clutch engaging and a clutch releasing position; a brake for said drum, said brake being biased toward applied position; a pressure motor for releasing said brake; manually controlled valve means for controlling said pressure motor; an electric switch associated with said clutch controller and arranged to be closed when the clutch controller is in clutch engaging position and opened at other times; emergency valve means having a first position in which it places said manually controlled valve in controlling communication with said motor but biased toward a second position in which it interrupts said communication and vents said motor; electrically actuated means which when energized holds said emergency valve means in said first position; and an electric circuit controlled by said switch and including said electrically actuated means.

6. The combination with the structure defined in claim 5, of overspeed and overwind devices driven by said drum, and including switches also controlling said electric circuit.

7. The combination of a power-driven shaft; a winding drum rotatably mounted relatively to said shaft; clutch means interposed between said shaft and said drum and having an engaged position and a released position; a clutch controller and associated electric switch having a clutch engaging position in which the switch is closed and a clutch releasing position in which the switch is open; a brake for said drum, said brake being biased toward applied position; a pressure motor for releasing said brake; manually controlled valve means for controlling said pressure motor; electrically actuated means effective when energized to permit said valve means to control said pressure motor, and when deenergized to inhibit such control and vent the motor; and an electric circuit controlled by said switch and including said electrically actuated means.

8. The combination of a power-driven shaft; a plurality of winding drums each mounted to rotate independently of said shaft; clutch means, one for each drum, each interposed between the shaft and the corresponding drum and each having an engaged position and a released position; clutch controllers, one for each clutch, each controller having a clutch engaging position and a clutch releasing position; power controlled brakes, one for each drum; a single manually operable brake controller for all said brakes; and means, one associated with each of said clutch controllers, and rendered effective by motion of the associated clutch controllers from clutch engaging position, to apply the brake on the corresponding drum irrespective of the action of said brake controller.

9. The combination of a power-driven shaft; a plurality of winding drums each mounted to rotate independently of said shaft; clutch means, one for each drum each interposed between the shaft and the corresponding drum and having an engaged position and a released position; clutch controllers, one for each clutch, each controller having a clutch engaging position and a clutch releasing position; power controlled brakes, one for each drum; a single manually operable brake controller for all said brakes; and means, one associated with each of said clutch controllers, and rendered effective by motion of the associated clutch controllers from clutch engaging position to disconnect the brake for the corresponding drum from said manual brake controller and apply said brake.

10. The combination of a power-driven shaft, a plurality of winding drums each mounted to rotate independently of said shaft; clutch means, one for each drum, each interposed between the shaft and the corresponding drum and each having an engaged position and a released position; clutch controllers, one for each clutch, each controller having a clutch engaging position and a clutch releasing position; brakes, one for each drum, each biased toward applied position; pressure motors, one for each brake, each operable to release its brake; manually controlled valve means capable of operating said motors simultaneously; and means, one associated with each clutch controller and rendered effective by motion thereof from clutch engaging position to vent the pressure motor for the brake associated with the corresponding drum.

11. The combination of a power-driven shaft; a plurality of winding drums each mounted to rotate independently of said shaft; clutch means, one for each drum, each interposed between the shaft and the corresponding drum and each having an engaged position and a released position; clutch controllers, one for each clutch, each controller having a clutch engaging position and a clutch releasing position; brakes, one for each drum, each biased toward applied position; pressure motors, one for each brake, each operable to release its brake; manually controlled valve means capable of operating said motors simultaneously; and means, one associated with each clutch controller and rendered effective by motion thereof from clutch engaging position to disconnect from said valve means, the motor which controls the brake for the corresponding drum and vent said motor.

12. The combination defined in claim 11, in which the manually controlled valve means comprises a single manually shiftable actuator, and a plurality of follow-up valve mechanisms, one for each motor, each connected with said actuator, and with a part moved by the motor which it controls.

13. The combination of a power driven shaft; a plurality of winding drums, each mounted to rotate independently of said shaft; clutch means, one for each drum, each interposed between the shaft and the corresponding drum and each having an engaged position and a released position; clutch controllers, one for each clutch, each controller having a clutch engaging position and a clutch releasing position; brakes, one for each drum, each biased toward applied position; pressure motors, one for each brake, each operable to release its brake; manually controlled valve means capable of operating said motors simultaneously; an electric switch associated with each of said clutching controllers and arranged to be closed when its clutch controller is in clutch engaging position and open at other times; emergency valve means, one for each pressure motor and each having a first position in which it places said manually controlled valve means in controlling communication with its associated motor, but biased toward a second position in which it interrupts said communication and vents said motor; electrically actuated means, one associated with each emergency valve means, and effective when energized to hold the same in its first position; and electric circuits, each controlled by one of said switches and each including one of the electrically actuated means, the switch and electrically actuated means so included in circuit with one another being related to the clutch and brake of the same drum.

14. The combination defined in claim 13 in which the manually controlled valve means comprises a single manually shiftable actuator, and a plurality of follow-up valve mechanisms, one for each motor, each connected with said actuator and with a part moved by the motor which it controls.

15. The combination of a power driven shaft; a plurality of winding drums arranged to be driven by said shaft, at least one of said drums being capable of rotation independently of the shaft; clutch means, one for each independently rotatable drum, each interposed between the shaft and the corresponding drum and each having an engaged position and a released position; power controlled brakes, one for each drum; a single manually operable controller for all said brakes; and means, one associated with each said clutch means and rendered effective as an incident to release of the associated clutch means to apply the brake on a corresponding drum irrespective of the action of said controller.

16. The combination of a power driven shaft; a plurality of winding drums arranged to be driven by said shaft, at least one of said drums being capable of rotation independently of the shaft; clutch means, one for each independently rotatable drum, each interposed between the shaft and the corresponding drum and each having an engaged position and a released position; power controlled brakes, one for each drum; a single manually operable controller for all said brakes; and means, one associated with each said clutch means and rendered effective as an incident to release of the corresponding clutch to disconnect the brake for the corresponding drum from said manual controller and apply such brake.

17. The combination of a power driven shaft; a winding drum rotatably mounted relatively to said shaft; clutch means interposed between said shaft and the drum and having an engaged position and a released position; an electric switch operatively related to said clutch and arranged to be closed as an incident to engagement and opened as an incident to release of said clutch; a brake for said drum, said brake being biased toward applied position; a pressure motor for releasing said brake; manually controlled valve means for controlling said pressure motor; emergency valve means having a first position in which it places said manually controlled valve in controlling communication with said motor, but biased toward a second position in which it interrupts said communication and vents said motor; electrically actuated means which when energized holds said emergency valve means in said first position; and an electric circuit controlled by said switch and including said electrically actuated means.

18. The combination of a power driven shaft; a winding drum mounted to rotate independently thereof; a clutch interposed between said shaft and drum and having engaged and released positions; a double acting fluid pressure clutch motor arranged to shift said clutch between said positions; a clutch controller comprising a manually operable distributing valve for said clutch motor; a brake for the drum; means biasing said brake to applied position; a fluid pressure brake motor effective when subjected to pressure to release said brake; a brake controller comprising manually operable valve means for admitting pressure fluid to and exhausting it from said brake motor; and means associated with the clutch controller and serving in clutch engaging position to connect said brake controller in controlling relation with said brake motor and in clutch releasing position to disconnect it therefrom and vent the brake motor, the parts being so arranged that failure of pressure fluid to the motors causes the brakes to apply irrespective of the position of both controllers.

19. The combination defined in claim 18 in which a single shaft is used with a plurality of independent drums each complete with clutch, brake, motors and controllers as specified, and a common actuator is provided for operating the brake controllers of the various drums in unison.

20. The combination of a power-driven shaft; a winding drum rotatably mounted relatively to said shaft; clutch means interposed between said shaft and drum and having an engaged position and a released position; a power-controlled brake for said drum; a manually actuated controller therefor; and means associated with said clutch means and rendered effective by motion thereof from said engaged position to disconnect said power actuated brake from said controller and apply the brake.

MAX T. KNUTZEN.